(No Model.)  2 Sheets—Sheet 1.
T. B. MILLER.
Ice Cutting Machine.
No. 240,445.  Patented April 19, 1881.
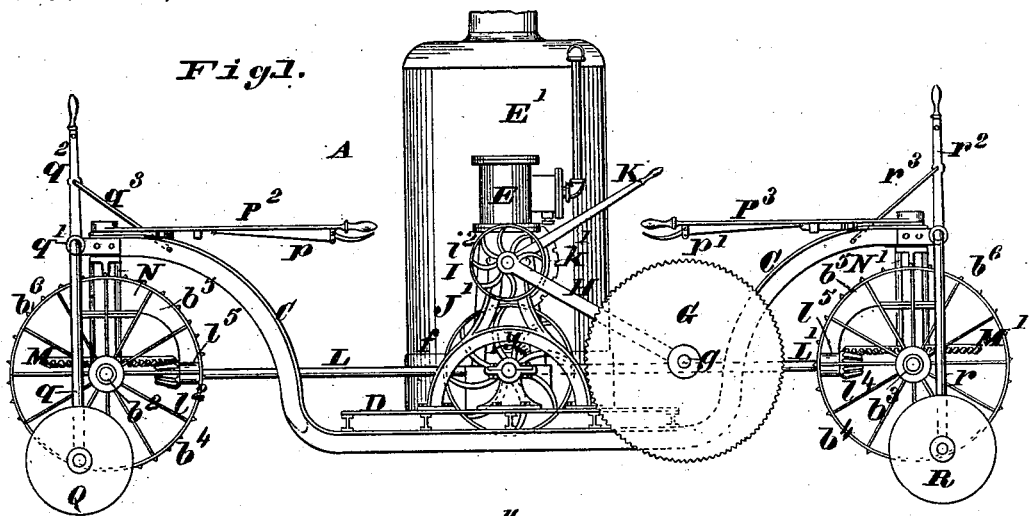
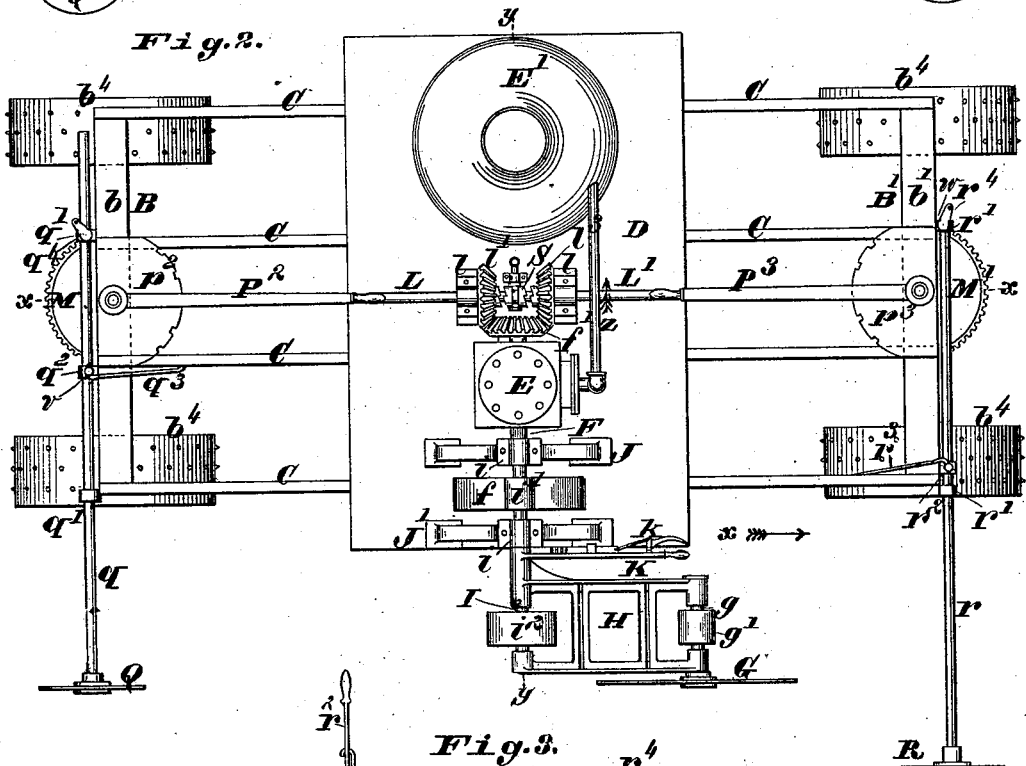
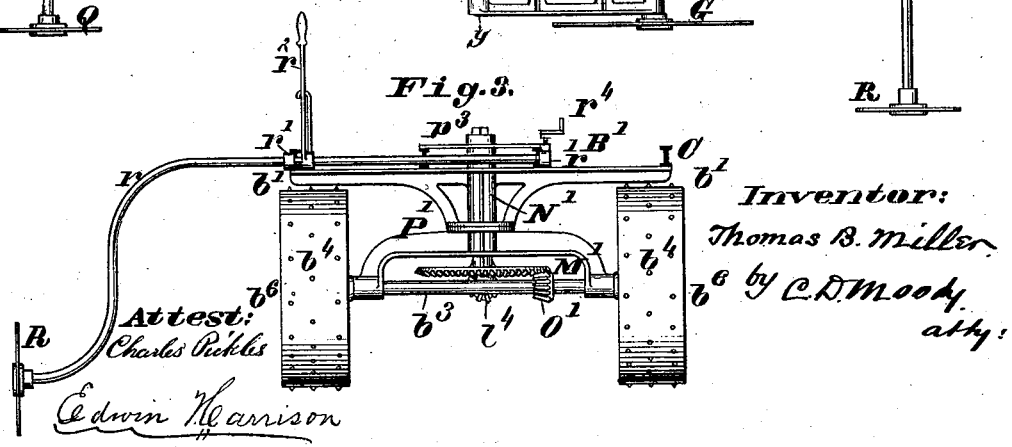
Attest:
Charles Pickles
Edwin Harrison
Inventor:
Thomas B. Miller
by C. D. Moody
atty (No Model.) 2 Sheets—Sheet 2.
T. B. MILLER.
Ice Cutting Machine.
No. 240,445. Patented April 19, 1881.
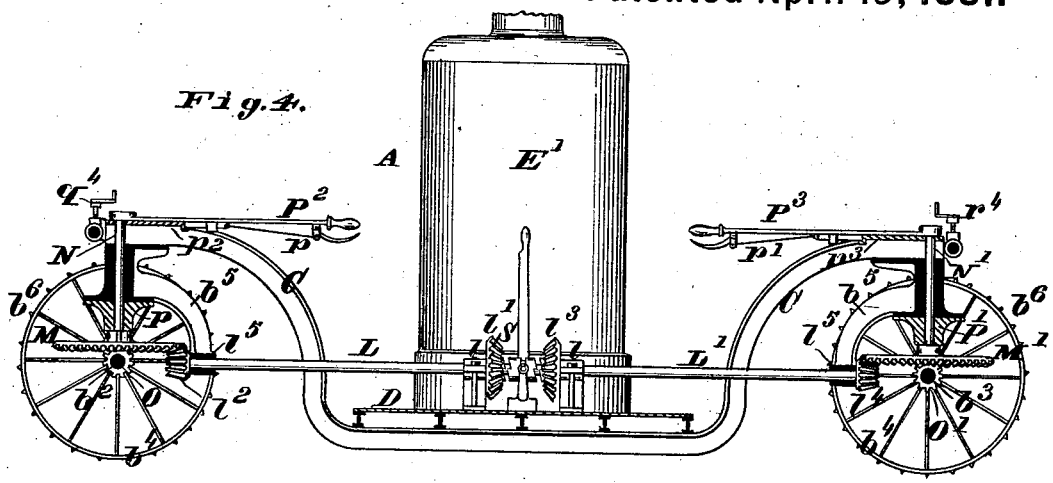
Fig. 4.
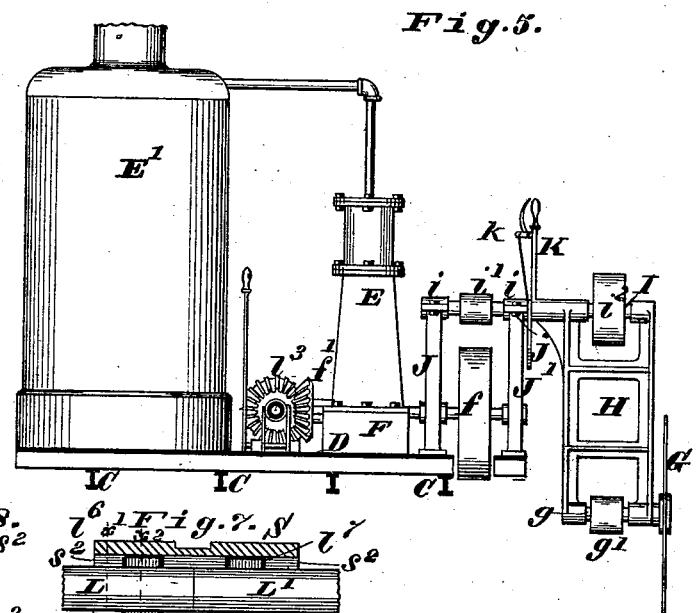
Fig. 5.
Fig. 8. Fig. 7.
Fig. 9.
Fig. 6.
Attest:
Charles Pickles
Edwin Harrison
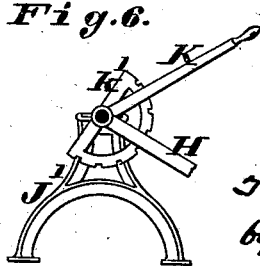
Inventor:
Thomas B. Miller
by C. D. Moody,
atty:

UNITED STATES PATENT OFFICE.

THOMAS B. MILLER, OF ST. LOUIS, MISSOURI.

ICE-CUTTING MACHINE.

SPECIFICATION forming part of Letters Patent No. 240,445, dated April 19, 1881.

Application filed February 8, 1881. (No model.)

*To all whom it may concern:*

Be it known that I, THOMAS B. MILLER, of St. Louis, Missouri, have made a new and useful Improvement in Ice-Cutting Machines, of which the following is a full, clear, and exact description, reference being had to the annexed drawings, making part of this specification, in which—

Figure 1 is a side elevation of the improved machine; Fig. 2, a plan; Fig. 3, an end elevation of the carriage of the machine; Fig. 4, a vertical section taken on the line $x\ x$ of Fig. 2; Fig. 5, a transverse vertical section taken on the line $y\ y$ of Fig. 2; Fig. 6, a detail, being a side elevation of the parts used in raising and lowering the saw; Fig. 7, a detail, being a longitudinal section taken through the clutch used in operating the feed-shaft; and Figs. 8 and 9 details, being cross-sections taken through the feed-shaft and clutch, and as upon the lines $x'\ x'$ and $x^2\ x^2$, respectively, of Fig. 7.

The same letters denote the same parts.

By means of the present invention the operation of cutting ice can be performed more rapidly, evenly, and economically than by the means hitherto in use.

Generally considered the improved machine consists of a carriage constructed for traveling upon the field of ice being cut, and provided with a steam-engine, by means of which motion is imparted to an ice-saw, which can be lowered when desired to cut the ice. The motion of the engine-shaft is also imparted to the carriage-wheels, causing the machine to be fed along upon the ice as the cut is made, and also enabling the machine to be moved upon the ice as desired. The carriage is also provided with mechanism for guiding its movement upon the ice, so that the machine shall be kept properly in place while cutting the ice, and so that the latter shall be evenly cut.

A represents the carriage of the machine. It consists, mainly, of the trucks B B' and the connecting-reaches C C C C, which at their ends are attached to the bolsters $b\ b'$, and at their centers are preferably depressed.

D represents a platform resting upon the reaches and supporting a steam-engine, E, boiler E', the main engine-shaft F, and the mechanism immediately connected with the ice-saw G, the saw-shaft $g$ being journaled in the outer end of an arm, H, which at its inner end is attached to and arranged to swing vertically upon a counter-shaft, I. The latter is journaled at $i\ i$ in uprights J J', which are supported upon the platform D.

The main shaft F is furnished with a pulley, $f$, and gear $f'$, the counter-shaft I with pulleys $i'\ i^2$, and the saw-shaft $g$ with the pulley $g'$. By means of suitable belts (not shown) leading from the pulley $f$ to the pulley $i'$ and from the pulley $i^2$ to the pulley $g'$, rotary motion is imparted to the shaft $g$ and saw G.

The arm H, carrying the saw G, can be turned upon the shaft I so as to let the saw down into the ice or to raise it out therefrom, as desired, the raising and lowering being effected by means of a lever, K, that is attached to the arm H, and the lever and arm can be fixed at any desired angle by means of the spring-dog $k$ engaging in the notched sector $k'$, which is fastened to the upright J'.

L L' represent shafts arranged longitudinally in the machine, turning in the bearings $l\ l^5$, and provided with the gears $l'\ l^2$ and $l^3\ l^4$, respectively.

M M' represent gears journaled, respectively, upon posts or spindles N and N'. The latter, N and N', are fastened, by means of the beams P P', to the truck-axles $b^2\ b^3$. The gears $l^2$ and $l^4$ respectively engage with the gears M and M'. The axles $b^2$ and $b^3$ respectively have the pinions O and O' fastened thereto, and which pinions engage, respectively, with the gears M M'. Hence, if the shafts L L' are rotated their motion is communicated to the truck-axles $b^2\ b^3$, and (the truck-wheels $b^4$, or one wheel in each pair, being fastened to the axles) the machine thereby caused to move over the ice.

The bearings $l^5\ l^5$ are attached to arms $b^5$ that depend from the bolsters $b\ b'$. The latter rest upon the cross-beams P P' and the axles $b^2\ b^3$ are journaled in the cross-beams. The wheels $b^4$ are furnished with projections $b^6$ to to prevent their slipping on the ice.

By means of the levers $P^2\ P^3$, which are fastened to the posts N and N', respectively, and which have spring-dogs $p$ and $p'$ respectively arranged to engage in the notched sectors $p^2\ p^3$, the trucks can be turned in any direction.

Q and R represent guides used in directing the movement of the machine over the ice during the cutting. They are in the form of plates, attached loosely to arms $q$ and $r$. The latter are held in bearings $q'$ and $r'$, respectively, and both so that they can be adjusted laterally, and so that they can be rotated in the bearings—that is, the arms can be set out transversely from the main portion of the machine or be drawn inward, according to the width of the strip of ice it is desired to cut, and according to the distance from the cut it is desired to have the main portion of the machine, and the arms can be turned in the bearings when it is desired to raise or lower the guides. The latter is effected by means of the levers $q^2$ $r^2$, which are fastened to the arms $q$ and $r$, respectively, and which can be held in the position shown in Figs. 1 and 3 by means of the detachable braces $q^3$ $r^3$, respectively. The arms are bent as shown in Fig. 3, and by turning the levers $q^2$ $r^2$ downward the guides are raised from the ice. The arms, after being adjusted laterally, are held by means of the set-screws $q^4$ $r^4$, and in use, one of the arms—say $q$—is adjusted laterally to bring the guide Q in the kerf being cut, and the other arm, $r$, is adjusted to bring the guide R in the previous cut. This serves to guide both ends of the machine and enable the strip to be cut evenly.

In practice the machine is brought into position upon the ice it is desired to cut and the engine is set in motion. The cutting-saw is operated in the manner above described. To feed the machine along upon the ice as the cutting proceeds, the operation is as follows: The motion of the main shaft F is communicated to the gears $l'$ $l^3$. These last-named gears are loose upon the shafts L L', but by slipping a clutch, S, Figs. 2, 4, 7, 8, 9, either forward or backward, so as to disengage the projections $l^6$ $l^7$ that are fastened to the shafts L L', respectively, from the recesses $s$ $s'$, respectively, in the clutch and into the longitudinal groove $s^2$ in the clutch, and so as to bring the clutch into engagement with the gear $l'$ or the gear $l^3$, the shafts L L' are caused to rotate and in the same direction.

If it is desired to move the machine in the direction indicated by the arrow $x$, Fig. 2, the main shaft F is rotated in the direction of the arrow $y$, Fig. 1, and the clutch is slipped in the direction of the arrow $x$ into engagement with the gear $l^3$. The shafts L L' then rotate in the direction of the arrow Z, Fig. 2, and the pinion O' being located upon the axle at the point $w$, Fig. 2, the machine moves in the desired direction.

If it is desired to have the machine move in the opposite direction, the shaft F is rotated in the same direction as before, and the clutch S slipped to engage with the gear $l'$, whereupon the pinion O being located upon the axle at the point $v$, Fig. 2, the machine moves backward.

If it is desired to move the machine sidewise, as in placing the machine for making a new cut, the trucks, by means of the levers P² P³, are turned as far as the shafts L L' will permit, and the engine-shaft and clutch S suitably operated, according to the direction it is desired to move in.

In making the first cut the guide R is not used, but afterward, in making the succeeding cuts, the guide R bears against the outer side of the strip of ice being cut, and the guide Q travels in rear of the saw in the cut being made. The clutch S is moved by means of a suitable lever, S'.

I claim—

1. The carriage A, having the shaft I, swinging arm H, lever K, dog $k$, sector $k'$, upright J', and saw G, combined substantially as described.

2. The combination of the shaft F, shafts L L', gears $f'$ $l'$ $l^3$, and clutch S, substantially as described.

3. The combination of the shafts L L', having the projections $l^6$ $l^7$, and the clutch S, having the recesses $s$ $s'$ and groove $s^2$, substantially as described.

4. The combination of the shaft L', gear $l^4$, gear M', axle $b^3$, and pinion O', substantially as described, and for the purpose set forth.

5. The combination of the lever P³, spindle N', bolster $b'$, cross-beam P', axle $b^3$, and wheels $b^4$, substantially as described.

6. The combination of the carriage A and the guides Q and R, substantially as described.

7. The combination, with an ice-cutting machine, of the guide Q and the bent arm $q$, said arm being adjustable laterally and turning in the bearings $q'$, substantially as described.

THOMAS B. MILLER.

Witnesses:
CHAS. D. MOODY,
CHARLES PICKLES.